United States Patent [19]

Nelson

[11] Patent Number: 5,404,848

[45] Date of Patent: Apr. 11, 1995

[54] AUTOMOTIVE DRIP PAD ASSEMBLY

[76] Inventor: David B. Nelson, 1915 La Cresta Rd., El Cajon, Calif. 92021

[21] Appl. No.: 287,504

[22] Filed: Aug. 8, 1994

[51] Int. Cl.6 .............................................. F02B 27/00
[52] U.S. Cl. ................................ 123/198 E; 180/69.1; 184/106
[58] Field of Search ..................... 123/198 E; 184/106; 180/69.1

[56] References Cited

U.S. PATENT DOCUMENTS

| | | | |
|---|---|---|---|
| 3,316,995 | 5/1967 | Fay | 184/106 |
| 3,329,231 | 7/1967 | Takenouchi | 184/106 |
| 3,651,884 | 3/1972 | Dorrjes | 184/106 |
| 3,669,204 | 6/1972 | Andrews | 184/106 |
| 3,809,175 | 5/1974 | Andrews | 184/106 |
| 4,875,537 | 10/1989 | Garnatz et al. | 184/106 |

Primary Examiner—Noah P. Kamen
Attorney, Agent, or Firm—Charles C. Logan, II

[57] ABSTRACT

An automotive drip pad assembly having an elongated drip pan with an oil absorbent pad attached to its top surface. The drip pan has a front wall, a rear wall, and laterally spaced side walls that form an open top container. Cylindrical bosses on the walls of the drip pan have vertical bore holes that receive the inner ends of four tie wires that are attached thereto. The outer ends of the tie wires are attached to fixed structural members on the under side of the vehicle. The drip pan can be positioned beneath the vehicle anywhere oil or oil related products leak.

8 Claims, 1 Drawing Sheet

U.S. Patent  Apr. 11, 1995  5,404,848
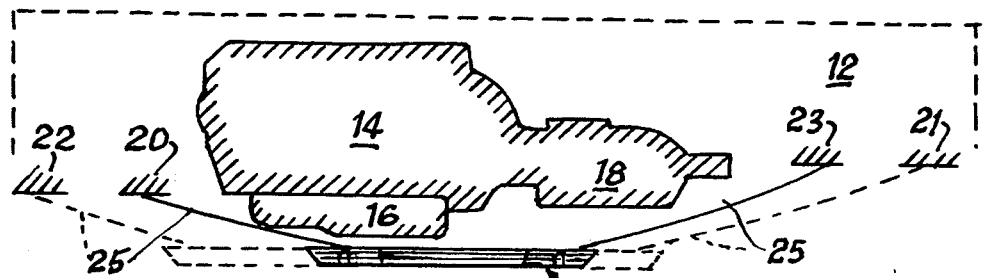
Fig. 1
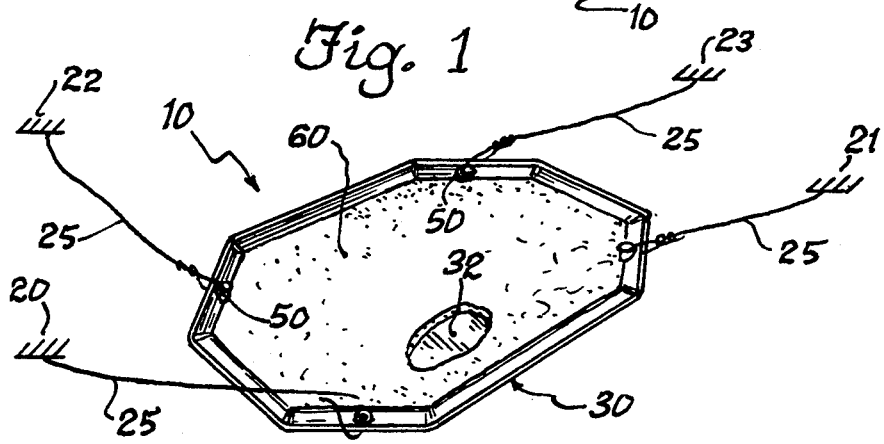
Fig. 2
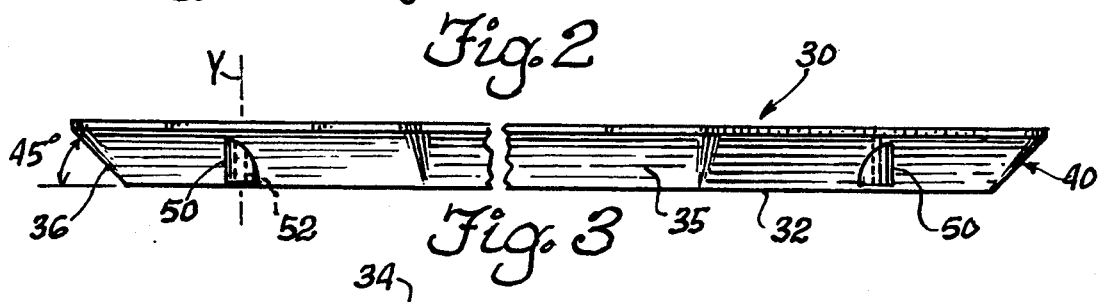
Fig. 3
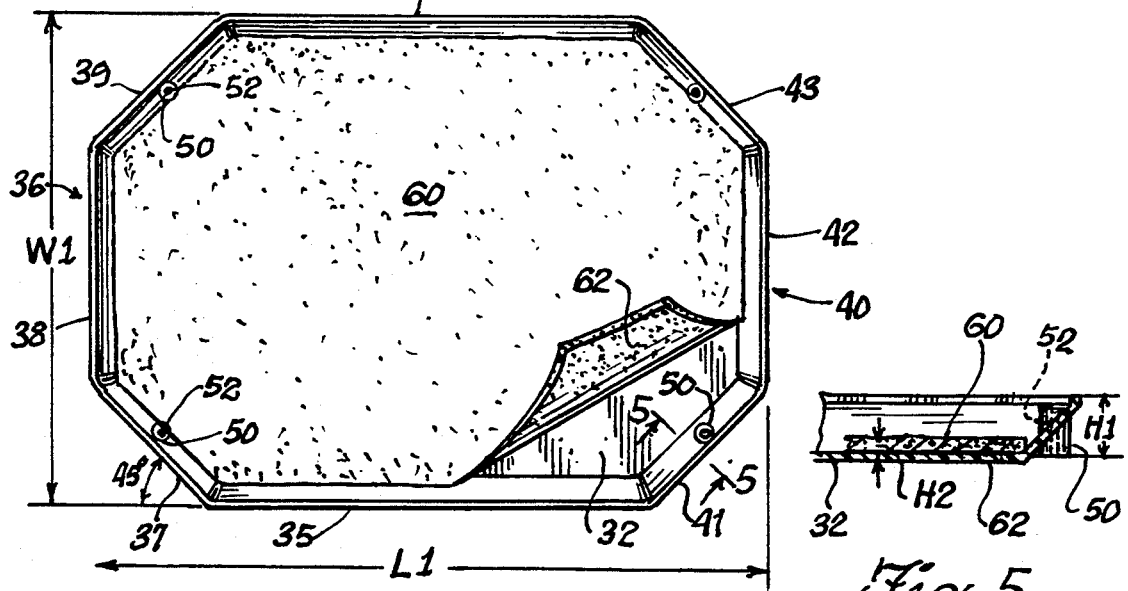
Fig. 4
Fig. 5

AUTOMOTIVE DRIP PAD ASSEMBLY

BACKGROUND OF THE INVENTION

The invention relates to oil or fluid drip pads and more particularly to a new and improved automotive drip pad assembly that can be secured to the underside of a vehicle.

Presently, 74% of the vehicles on the highway are over 4 years old and a great may of them have oil or fluid leaks. Often the cost of repairing the oil or fluid leak is substantial and the owner may not have sufficient money to cover the expense of the repairs. One of the most common areas for finding the oil or fluid leaks is on a garage floor or driveway. These leaks are both unsightly and dangerous. Every year there are hundreds of people injured in oil-related slip and fall accidents. Oil leaks on the roadways become a serious problem during wet weather where 80% of the accidents are caused by oil on the roads.

There have been previous inventions that have recognized the oil drip problem but none of these have solved the problem.

The Paananen U.S. Pat. No. 3,815,702 is directed to an automotive drip pad assembly designed to catch oil and grease leaks from the engine and transmission. It shows a pad member supported by brackets that have to be secured to bolts conventionally employed to mount the oil pan on the engine.

The Moon U.S. Pat. No. 4,577,713 is directed to an automotive engine oil drip pan that has its top surface specifically contoured to mate with the bottom surface of the engine and transmission and could only be used for leaks emanating therefrom. Special attachment brackets are required and these are installed by removing existing bolts and placing the bracket over the hole from which the bolt was removed. The bolt is then passed back through a clearance hole in the bracket and the bolt is tightened to secure the bracket in place. The bracket has a second hole through which a suspension element passes.

The Miller U.S. Pat. No. 4,750,775 is directed to an engine oil leak catch pan for leaks from the joint between the engine and the transmission housing. The top surface of the unit is specifically contoured to the shape of the transmission housing and can only be used for catching leaks in this area.

The Clausen U.S. Pat. No. 4,936,418 is directed to an oil drip collector that is only used while the vehicle's oil is changed. This collector can not remain on the vehicle while it is being driven. It is an object of the invention to provide a novel automotive drip pad assembly that is easily installed under a car in just a few minutes and requiring no tools.

It is also an object of the invention to provide a novel automotive drip pad assembly that is economical to manufacture and market.

It is another object of the invention to provide a novel automotive drip pad assembly that can be used under an oil pan, a transmission or anywhere oil or fluid is leaking beneath the vehicle.

It is an additional object of the invention to provide an automotive drip pad assembly that can be used on automobiles, trucks, buses, tractors, equipment, boats, etc.

It is a further object of the invention to provide a novel automotive drip pad assembly having an absorbent pad that holds over 1 quart of oil or transmission fluid without leaking.

SUMMARY OF THE INVENTION

The novel automotive drip pad assembly has been designed for universal application so that it can be used to catch drips from a front seal leak, a front timing cover leak, leaks from the front or rear portion of the engine, transmission leaks, rocker cover leaks, leaks from timing cover seals, oil pan leaks, main seal leaks, power steering pump leaks, and anywhere oil or fluid leaks.

The automotive drip pad assembly has an elongated drip pan that is longer than it is wide so that it can be attached under the vehicle and either aligned longitudinally or transversely. The 45 degree corners that have been built into the drip pan give extra strength to the wire tieing area. The 45 degree angles also triangulate the pressure on the drip pad so that it may be held tighter under the vehicle. The cylindrical bosses give additional strength in the tieing area and their bore holes on the vertical axis allow the tie wires to distribute the stress they apply to the corners of the drip pad.

The drip pan is made of a high temperature plastic that is impregnated with fiberglass so it will not melt until heated above 400 degrees F. The absorbent pad absorbs oil and other petroleum products but not water, which it repels. The pad will hold up to 1.25 quarts of oil.

The tie wires are made of stainless steel material which will not melt until heated over 1000 degrees F. This allows them to be located in close proximity to the exhaust or manifold pipes.

The procedure for installing the automotive drip pad assembly begins by locating the oil leaks by observing where fresh drips are formed. By placing newspapers under the vehicle overnight, the exact area of leaking can be determined. Using the four tie wires that are provided, the drip pan would be tied tightly up against the area where the drips were found. The tie wires should be inserted through the holes in the four corners of the drip pan and twisted at least three times. The other end of the tie wires can be attached around the frame, motor mounts or anything strong enough to hold the drip pan firmly in place. These ends need only three twists to hold firmly. By tieing the drip pan tightly against the bottom of the engine or other structure, there is very little loss of clearance.

No mechanical expertise is required to install the novel automotive drip pad assembly. Also no tools are required and it installs in minutes. Additionally, it can be installed anywhere under the vehicle where leaks are found.

DESCRIPTION OF THE DRAWING

FIG. 1 is a schematic side elevation view showing the novel automotive drip pad assembly secured to the under side of an automotive vehicle;

FIG. 2 is a schematic front perspective view showing the manner in which the automotive drip pad assembly is secured to a vehicle;

FIG. 3 is a side elevation view of the drip pan;

FIG. 4 is a top plan view of the drip pan; and

FIG. 5 is a cross sectional view taken along lines 5—5 of FIG. 4.

DESCRIPTION OF THE PREFERRED EMBODIMENT

Applicant's novel automotive drip pad assembly will now be described by referring to FIGS. 1-5 of the drawing. The automotive drip pad assembly is generally designated numeral 10. In FIGS. 1 and 2 it is illustrated secured to the underside of vehicle 12 beneath engine 14, oil pan 16 and transmission 18. Numerals 21-24 identify fixed structural members on the underside of the vehicle to which the outer end of tie wires 25 may be attached.

Drip pan 30 has a bottom panel 32 having a front end, a rear end, and laterally spaced right and left edges. Extending upwardly from bottom panel 32 is right side wall 34 and left side wall 35. A front wall 36 extends upwardly from the front end of bottom panel 32 and it has a left side portion 37, a central portion 38 and a right side portion 39. These respective wall portions are planar in configuration and intersect each other at 45 degree angles. Rear wall 40 has a left side portion 41, a central portion 42 and a right side portion 43. These respective wall portions are also planar in configuration and intersect each other at 45 degree angles. All of the walls and wall portions also extend upwardly and outwardly from the bottom panel at a 45 degree angle. Drip pan 30 has a predetermined length L1 that is in the range from 8"-20". Drip pan 30 also has a predetermined width W1 that is in the range of 8"-16". The respective walls have a predetermined height Hi that is in the range from $\frac{1}{2}$"-1$\frac{1}{4}$".

Cylindrical shaped boss members 50 have a vertical Y-axis and a bore hole 52 extends from its top surface to its bottom surface. The respective cylindrical shaped boss members are partially formed on the inner surface of the wall portions and partially on the outer surface of the wall portions. Drip pan 30 is integrally molded from a plastic material impregnated with fiberglass and this material will not melt until heated over 400 degrees F. The inner ends of tie wires 25 are attached to the respective bore holes 52.

Absorbent pad 60 is configured to the shape of bottom panel 32 and secured thereto by adhesive 62. Absorbent pad 60 has a height H2 that is in the range of $\frac{1}{4}$"-$\frac{1}{2}$". Absorbent pad 60 is made of microfiber material which has millions of tiny pockets that can absorb most types of fluids. The 3M Company markets such a product under the name Maintenance Sorbents.

What is claimed is:

1. An automotive drip pad assembly in combination with an automotive vehicle powered by an internal combustion engine connected to a transmission, said automotive drip pad assembly comprising:

an elongated drip pan having a predetermined length L1 that is in the range from 8"-20" and a predetermined width W1 that is in the range from 8"-6";

said drip pan having a bottom panel having a front end, a rear end, a left edge, a right edge, a top surface and a bottom surface;

said drip pan having a front wall having a top edge and a bottom edge, said bottom edge being connected to the front edge of bottom panel;

said drip pan having a rear wall having a top edge and a bottom edge, said bottom edge being connected to the rear end of said bottom panel;

said drip pan having a left side wall having a top edge and a bottom edge, said bottom edge being connected to the left edge of said bottom panel;

said drip pan having a right side wall having a top edge and a bottom edge, said bottom edge being connected to the right edge of said bottom panel;

said front wall, said rear wall, said right side wall and said left side wall having a predetermined height H1 that is in the range from $\frac{1}{2}$"-1$\frac{1}{4}$";

said drip pan with its bottom panel and respective side walls being integrally molded;

an oil absorbent pad having a top surface and a bottom surface, said bottom surface being positioned on the top surface of the bottom panel of said drip pan;

at least four tie wires having an inner end and an outer end;

at least four apertures in said respective walls and they are laterally spaced about the periphery of said drip pan at predetermined positions;

the inner ends of said four tie wires being attached to said respective four apertures in said walls and the outer ends of said four tie wires being attached to four different fixed structural members found on the underside of said automotive vehicle;

said front wall having a planar left side portion, a planar central portion and a planar right side portion and they intersect each other at substantially 45 degree angles; said rear wall having a planar left side portion, a planar central portion, and a planar right side portion and they intersect each other at substantially 45 degree angles; and the left side portion and the right side portion of said front wall and the left side portion and the right side portion of said rear wall each have a vertically oriented cylindrical boss and said previously recited apertures are vertical bore holes in said respective cylindrical bosses to which the inner ends of said tie wires are attached.

2. An automotive drip pad assembly as recited in claim 1 wherein the top edges of said respective walls are all in the same horizontal plane.

3. An automotive drip pad assembly as recited in claim 1 wherein said drip pan has a planar top surface.

4. An automotive drip pad assembly as recited in claim 1 wherein said drip pan has a planar bottom surface.

5. An automotive drip pad assembly as recited in claim 1 wherein said walls slope outwardly from said bottom panel at substantially a 45 degree angle.

6. An automotive drip pad assembly as recited in claim 1 wherein said drip pan is made of a material that won't melt until heated over 400 degrees F.

7. An automotive drip pad assembly as recited in claim 1 wherein said tie wires are made of a material that won't melt until heated over 1000 degrees F.

8. An automotive drip pad assembly as recited in claim 1 wherein said oil absorbent pad is made of a microfiber material which has millions of tiny pockets that absorb petroleum based fluids.

* * * * *